(12) United States Patent
Sallee et al.

(10) Patent No.: US 7,117,737 B2
(45) Date of Patent: Oct. 10, 2006

(54) SEALED INDEX COVER FOR METER

(75) Inventors: Richard Alan Sallee, Houston, TX (US); Hooshang Andrew Befrui, Houston, TX (US)

(73) Assignee: Dresser, Inc., Addison, TX (US)

( * ) Notice: Subject to any disclaimer, the term of this patent is extended or adjusted under 35 U.S.C. 154(b) by 125 days.

(21) Appl. No.: 10/840,684

(22) Filed: May 6, 2004

(65) Prior Publication Data

US 2005/0247122 A1 Nov. 10, 2005

(51) Int. Cl.
G01F 15/14 (2006.01)
(52) U.S. Cl. ....................................................... 73/273
(58) Field of Classification Search .................... 73/273
See application file for complete search history.

(56) References Cited

U.S. PATENT DOCUMENTS

| | | | | |
|---|---|---|---|---|
| 3,835,372 | A | * | 9/1974 | Adair .......................... 324/419 |
| 3,893,586 | A | * | 7/1975 | Derose et al. ............... 220/324 |
| 4,080,030 | A | * | 3/1978 | Ustin .......................... 439/230 |
| 4,100,799 | A | * | 7/1978 | Bradham et al. ............. 73/197 |
| 5,499,159 | A | * | 3/1996 | Gatz .......................... 361/667 |
| 5,687,975 | A | * | 11/1997 | Inciong ....................... 277/591 |
| 5,792,822 | A | * | 8/1998 | Miyabayashi et al. ...... 526/240 |
| 6,386,790 | B1 | * | 5/2002 | Thiel et al. .................. 403/335 |
| 6,646,864 | B1 | * | 11/2003 | Richardson .................. 361/681 |
| D488,083 | S | | 4/2004 | Hopfe et al. |
| 6,918,311 | B1 | * | 7/2005 | Nathan ....................... 73/866.1 |
| 2004/0246143 | A1 | * | 12/2004 | Crichlow ................ 340/870.02 |
| 2005/0035914 | A1 | * | 2/2005 | Winter ......................... 343/719 |

OTHER PUBLICATIONS

Website, www.mcmaster.com/products, McMaster-Carr Supply Company Catalog, "Over 410,000 Products to Choose From" (3 pages) and "O-Rings", p. 3229, copyright 2004.
Itron, "Functionality Profile 41ER-1 ERT Module," Copyright 2003, 2 pages.
Elster Electricity LLC, "A3 Alpha® Meter with 50ESS ERT®," Mar. 2004, 2 pages.
Itron, "40G ERT® Commercial," Copyright 2002, 2 pages.
Icon, "Electronic Network Meter with integrated Itron® 51 ESS ERT Type iNA1," at least Jul. 2004, 2 pages.
Icon, "Electronic Meter Technical Manual," Copyright 2002, 37 pages.
American Meter Company, "Products & Services", www.americanmeter.com/en/products_and_services.shtml, printed Sep. 27, 2004, 2 pages.
American Meter Company, "General Product Catalog," May 2003, 24 pages.
AMCO Automated Systems LLC, "Direct Gas-Meter Transponder (DGT)," PDB-14600.1, Sep. 2002, 2 pages.

* cited by examiner

*Primary Examiner*—Max Noori
(74) *Attorney, Agent, or Firm*—Fish & Richardson P.C.

(57) ABSTRACT

A flow meter having an index cover adapted to house an index of the meter seals to the remainder of the meter with an elastomeric ring seal received between the index cover and the meter body. The ring seal defines a plurality of lines substantially parallel to the perimeter of the ring seal along which the seal is adapted to seal against a surface of the index cover and to seal against the substantially planar surface of the flow meter body.

19 Claims, 3 Drawing Sheets

SEALED INDEX COVER FOR METER

TECHNICAL FIELD

This disclosure relates to flow meters, and more particularly to a sealed index cover for use in a flow meter assembly.

BACKGROUND

An index cover houses the index of a meter, such as a gas flow meter, and protects the index from the elements to which the flow meter may be subjected. In many installations, the meters are outdoors and subjected to rain, sun, and dirt, or though indoors or partially protected from the elements, still located in dirty and moist environments. While the juncture of the index cover to the remainder of the meter is generally sealed, the effectiveness of the seal has not been considered crucial to the function of the meter. Thus, prior art index covers have incorporated seals of marginal integrity that, for the most part, seal water and other contaminates out of the interior of the index cover, but that still allow a small amount of leakage. Others have even included vent passages in the seals or index covers to allow communication of air and moisture between the interior and exterior of the index cover, thus intentionally facilitating leakage. As is apparent from the marginal seals of the prior index covers and inclusion of vent passages in many seals, the value of an effective seal between the index cover and the remainder of the meter has heretofore gone unappreciated.

SUMMARY

The applicants have come to realize that an effective seal should be provided between the index cover and the remainder of the flow meter, because a small leakage into the interior of the prior art index meters, over time, affects the functionality of the flow meter. For example, the leakage over time can allow moisture into the index cover to build up and condense on the interior of the index cover. Such condensation may obscure the view through the index cover to the display portion of the index.

The invention encompasses an improved index cover and flow meter that provides improved sealing at the juncture.

In one illustrative implementation, a device for use in measuring flow includes a meter body housing a flow measuring device adapted to output a signal indicative of a flow from an inlet of the meter body to an outlet of the meter body. The meter body has a substantially planar surface on an exterior surface. An index is coupled to the meter body about the substantially planar exterior surface and the flow measuring device. The index is adapted to display a representation of the amount of flow. An index cover is adapted to house the index and defines an open end through which the index is received. The index cover is adapted to join to the meter body about the substantially planar surface. An elastomeric ring seal is received between the index cover and the meter body. The ring seal defines a plurality of lines substantially parallel to the perimeter of the ring seal along which the seal is adapted to seal against a surface of the index cover. The ring seal is also adapted to seal in at least two locations against the substantially planar surface of the flow meter body when the index cover is joined to the flow meter.

In another illustrative implementation, a flow meter includes a first housing adapted to house a first portion of a flow measuring device. The first housing has a flow inlet and a flow outlet. A second housing is adapted to house a second portion of the flow measuring device and to join to the first housing. The second housing has at least a transparent region through which the second portion of the flow measuring device can be seen. An elastomeric seal formed in a ring is adapted to be positioned between the first housing and the second housing about the flow measuring device. The elastomeric seal has a plurality of fins extending substantially parallel to a perimeter of the elastomeric seal. The fins are operable to abut and substantially seal against the first and second housings.

In another illustrative implementation, a device for measuring flow includes a means for measuring and outputting a signal indicative of a flow between an inlet of the device and an outlet of the device. A housing is adapted to house the means for measuring flow. A means for transforming the output signal to a representation of an amount of flow is provided. A cover adapted to house the means for transforming is provided. A means for sealing along a plurality of seal lines between the housing and the cover is also provided.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
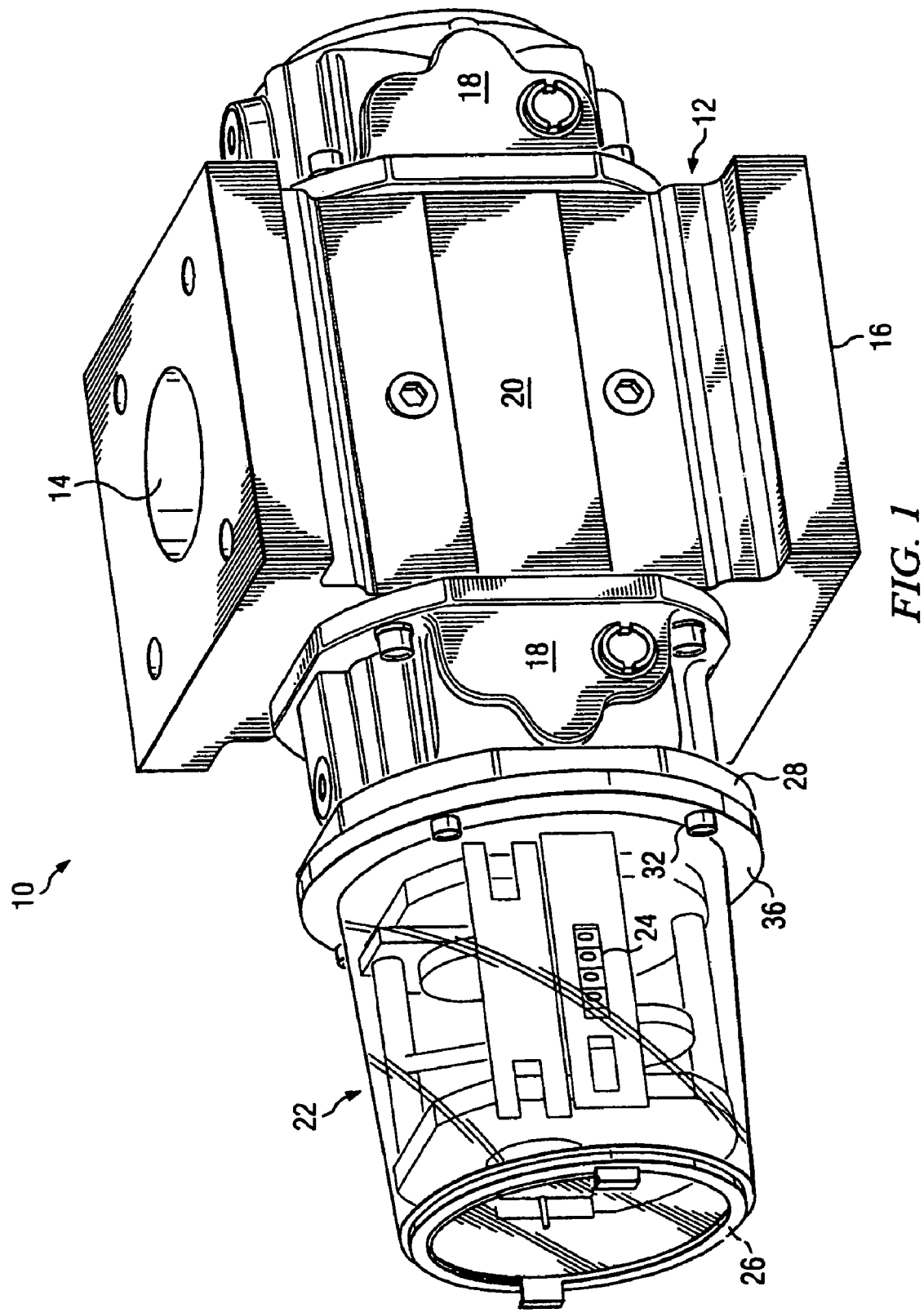
FIG. 1 is a perspective view of an illustrative flow meter assembly according to an embodiment of the invention.

Referring first to FIG. 1, an illustrative flow meter assembly 10 according to an embodiment of the invention is depicted in perspective view. The flow meter assembly 10 includes a meter body 12 having an inlet opening 14 communicating with an interior of the meter body 12, and an outlet opening 16 also communicating with the interior of the meter body 12. The meter body 12 of FIG. 1 is depicted as a multi-part body having meter sub-bodies 18 affixed to a meter central body 20. It is, however, within the scope of the invention to provide the meter body 12 as a single piece or with a fewer or greater number of meter sub-bodies 18 and meter central bodies 20.

The meter body 12 internally houses a flow mechanism (not specifically shown) used in measuring a cumulative flow of fluid (ex. gas) flowing from the inlet opening 14 to the outlet opening 16. In one instance, the flow mechanism may include a Roots type flow mechanism. A Roots type flow mechanism, as well known in the art, has intermeshing figure-8 shaped impellers into which fluid flow from the inlet opening 14 is directed. Passage of the flow between the impellers and to the outlet opening 16 causes the impellers to rotate in relation to the flow of the fluid. The rotational rate of the impellers is then measured to determine the amount or rate of flow. While described as a Roots type flow mechanism herein, the flow mechanism may alternately include other types of mechanisms for use in measuring flow, such as other positive displacement type meters, a turbine flow meter, magnetic flow meter, ultrasonic flow meter, or other type of mechanism that translates fluid movement into mechanical movement or electrical signal.

The output of the flow mechanism is measured by an index 22 coupled to the meter body 12. The index transforms the output from the flow mechanism into a determination of flow rate and/or cumulative flow, and the determination of flow is displayed on a display 24 of the index 22. The index 22 may perform the transformation mechanically, electrically, or by using a combination of mechanical and electrical mechanisms. In the illustrative flow meter assembly 10 of FIG. 1, the index 22 is coupled to one of the meter sub-bodies 18 to measure rotation of the figure-8 shaped impellers, transform the rotation to a determination of cumulative flow, and display the cumulative flow on the display 24. The index 22, including the display 24, is housed in an index cover 26. The index cover 26 is coupled to the meter body 12 and sealed by a ring seal 27 between the index cover 26 and the meter body 12.

Figure 2:
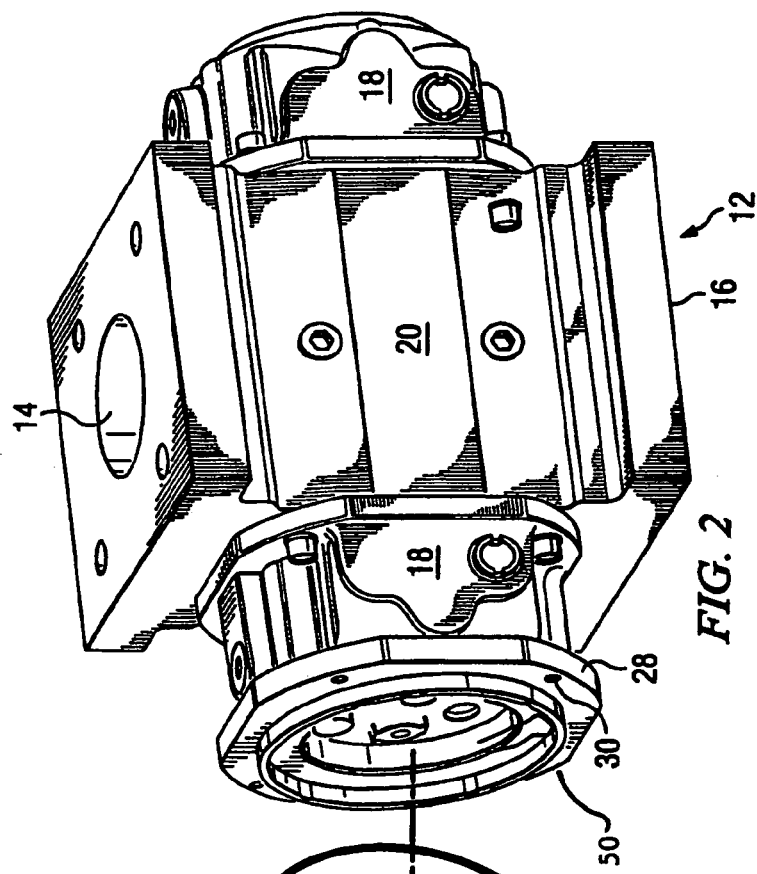
FIG. 2 is an exploded perspective view of the illustrative flow meter assembly of FIG. 1 showing the index, index cover, and ring seal removed from the meter body of the flow meter assembly.

Referring now to FIG. 2, the index cover 26 operates to shield the index 22 from the environment in which the flow meter assembly 10 is installed, for example, by keeping dirt and moisture off the index's mechanism and display 24. The index cover 26 is a housing adapted to encase the index 22 and having an open end through which the index 22 is received. In the illustrative flow meter assembly 10 of FIGS. 1 and 2, the index 22 is configured in a substantially cylindrical shape to be housed within a substantially cylindrical index cover 26. It is anticipated, however, that the index 22, as well as the index cover 26, can be configured in other shapes. For example, FIG. 4 depicts an alternate flow meter 52 with an index cover 40 (discussed in more detail below) configured as a box.

To enable the display to be seen through the index cover 26, at least a region about the display 24 is transparent. The transparent regions can be achieved by forming the index cover 26 entirely from a transparent material, such as transparent polymer, or by including transparent materials in an index cover 26 formed of an opaque material. If formed entirely from a transparent material, the index cover 26 may be left entirely transparent, as in FIG. 1, or may be manufactured to be opaque or translucent in regions away from the display 24, such as with paint or with a surface texture that reduces the transparency of the polymer. Polymer is suitable as a material for the index cover 26, because it is inexpensive and non-corrosive, although, other materials can be used.

In the illustrative flow meter assembly 10, the index cover 26 is coupled to the meter body 12 at the sub-body 18. The sub-body 18 to which the index 22 is coupled includes a meter body flange 28 extending radially outward from the sub-body 18. The flange 28, best seen in FIG. 2, provides a substantially planar surface against which the ring seal 27 can seal. The flange 28 also includes a plurality of threaded bolt holes 30. A plurality of bolts 32 pass through bolt holes 34 of a corresponding flange 36 associated with the index cover 26 and are threadingly received in the bolt holes 30. Tightening the bolts 32 draws the index cover flange 36 against the meter body flange 28, and holds the index cover 26 to the meter body 12. The meter body flange 28 may also include an alignment ring 50 that substantially circumscribes an interior of the ring seal 27. The alignment ring 50 operates to align the index cover 26 with the meter body 12, as well as further shield the index 22 from intrusion of moisture and particulate.

Figure 3:
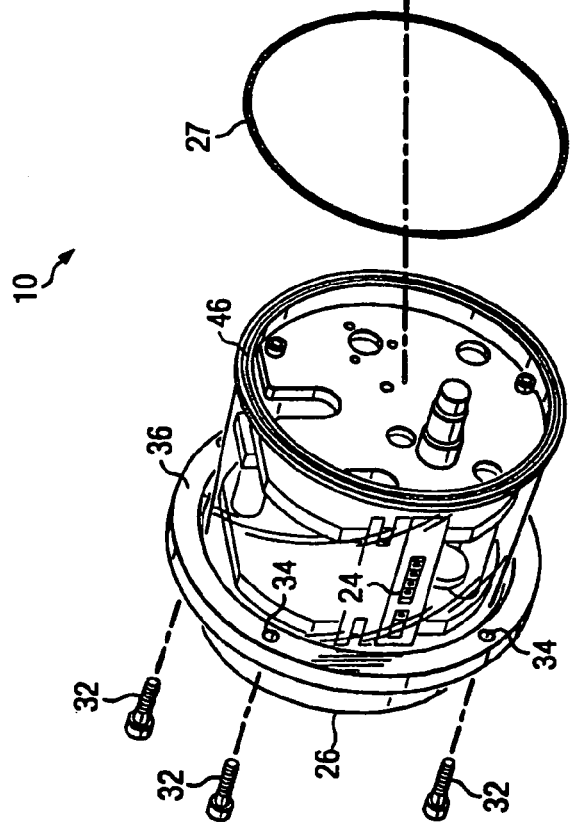
FIG. 3 is a detail cross-sectional view of the interface between the index cover, the ring seal, and the meter body of the flow meter of FIG. 2.
Figure 3:
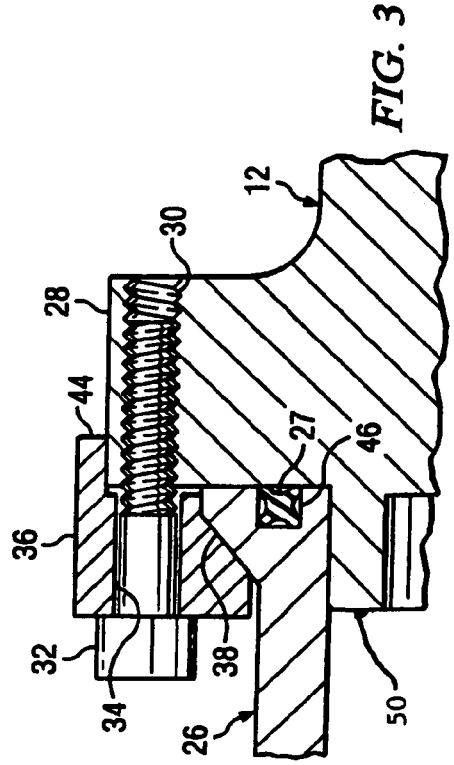
Figure 4:
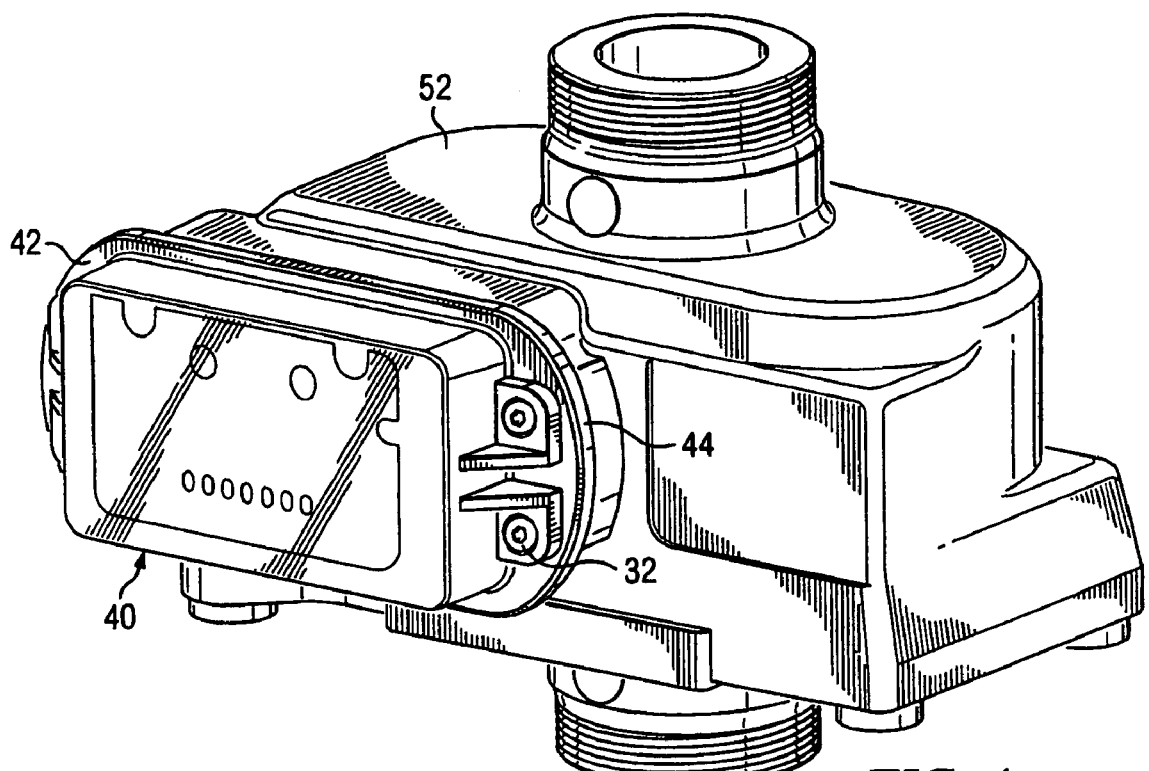
FIG. 4 is a perspective view of another illustrative flow meter assembly according to an embodiment of the invention.
Figure 5:
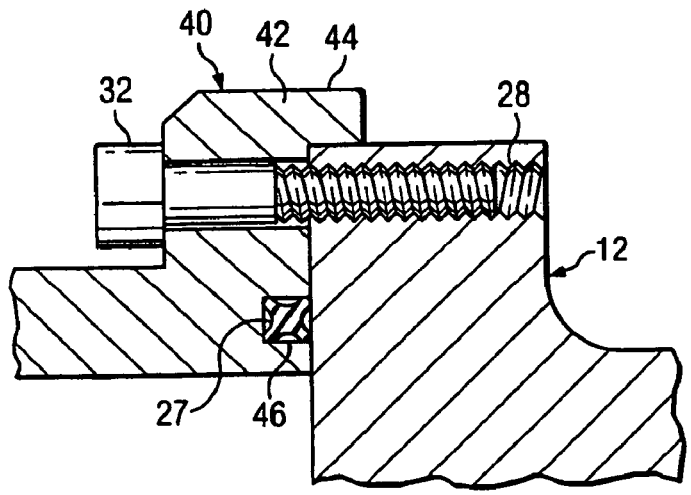
FIG. 5 is a detail cross-sectional view of the interface between the index cover, the ring seal, and the meter body of the flow meter of FIG. 4.

The index cover flange 36 may be separate from the index cover 26 (FIG. 2), or may be affixed to the index cover 40 (FIG. 4). The index cover flange 36 that is separate from (or movable relative to) the index cover 26 is best seen in FIG. 3 showing a cross-sectional detail of the interface between the index cover 26 and the meter body 12. In this instance, the index cover 26 is provided with an exterior shoulder 38 upon which the separate index cover flange 36 abuts when clamping the index cover 26 to the meter body 12. Of note, the separate index cover flange 36 can be manufactured from an opaque material, such as metal (ex. aluminum) or an opaque polymer, to shield the ring seal 27 from UV damage. The index cover flange 42 that is affixed to the index cover 40 is best seen in FIG. 5 showing a cross-sectional detail of the interface between the index cover 40 and the meter body 12. In this instance, the flange 42 may be integrally formed with the index cover 40 or may be a separate part that is joined to the index cover 40.

Although described herein as a flanged connection with threaded connectors (bolts 32), the index cover 26 can be held to the meter body 12 in another manner, for example, using other types of connectors (such as snaps, rivets, spring clips, or other numerous types of fasteners), by threading the index cover 26 directly to the meter body 12, by providing a circlip connection between the index cover 26 and the meter body 12, or in numerous other manners that would hold the index cover 26 against the meter body 12.

The ring seal 27 is contained in a ring seal groove 46 that circumscribes the index cover 26. Alternatively, the ring seal groove 46 could be provided on the meter body 12, or a seal groove 46 could be provided both on the index cover 26 and meter body 12. In many prior art index covers, there were no provisions to retain the seal in relation to the index cover or the meter body prior to installation. The integrity of the resulting seal thus suffers from misalignment of the seal. With pre-formed seals, such as flat elastomer or cork seals, it is difficult to maintain alignment of the seal while simultaneously trying to fit and align the index cover to the remainder of the meter. This difficulty is exacerbated by inclimate environmental conditions (cold, rain, dirt and oil, or other contaminates), or, as in the illustrative flow meter assembly 10, if the seal must be aligned to a vertical surface. Accordingly, the ring seal groove 46 can be configured to receive and retain the ring seal 27 when the index cover 26 is apart from the meter body 12, for example, by providing the ring groove 46 profile with an opening that is narrower than the width of the ring seal 27. The groove 46 is further configured so the ring seal 27 partially compresses and seals with the interior of the groove 46 as well as the meter body 12 when the index cover 26 is mated to the meter body 12.

With unmolded form-in-place type seals (ex. a liquid polymer applied to the index to dry and form a seal) the resulting seal sticks to the index cover. It is difficult, however, to form a consistent seal due to inconsistencies (such as ripples, bubbles, or surface contaminate) in the surface texture of the resulting seal. If the seal is damaged, the index cover must be replaced or all remnants of the seal removed and a new seal formed in place. It is within the scope of the invention that the ring seal 27 be co-injected or overmolded with the index cover 26. Co-injection involves injection molding both the index cover and seal substantially simultaneously in the same mold. Over molding involves molding the seal onto the index cover, but unlike unmolded form-in-place type seals, using a mold to define the surface of the ring seal 27. The result is a ring seal 27 that adheres to the index cover 26 to be retained when the index cover 26 is apart from the meter body 12, and that has a controlled surface texture to ensure a consistent seal.

Figure 6:
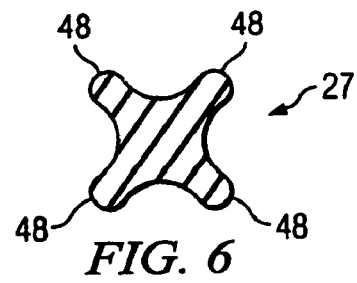
FIG. 6 is a detail cross-sectional view of an illustrative ring seal for use in a flow meter assembly according to an embodiment of the invention.

The illustrative index cover 26 uses a particular type of ring seal 27 depicted in FIG. 6 that is elastomeric, and has an X-shaped cross section; however, it is within the scope of the invention to use other types of seals, for example, ring seals of other cross-sections (such as Y, H, circular, and polygonal cross-sections), ring seals incorporating a sealing bulb (for example, having a hollow D, P or B-shaped cross-section), or numerous other types of compressible seals formed from elastomer, polymer, metal or otherwise. In the instance of the X-shaped cross-section ring seal 27, the ring seal groove 46 is dimensioned and shaped for the X-shaped cross-section ring seal 27. The ring seal 27 may form a continuous ring or may be split. The ring seal 27 is distinct from a flat seal, in that a flat seal is thin relative to it's width (i.e. a low height to width aspect ratio). The ring seal 27 has a height to width aspect ratio that is near, though not necessarily equal to, unity.

The X-shape defines four elongate fins 48 extending substantially parallel to a perimeter of the ring seal 27. The four fins 48 provide two lines of contact against the interior of the ring seal groove 46 and two lines of contact against the meter body 12. As the two lines of contact on each surface are displaced from one another, the fins 48 seal in two separate lines (i.e. top and bottom right fins 48 form one seal line and top and bottom left form another). If, for example, contaminate or surface defects prevent effective sealing along one of the two separate lines of sealing, the other line of sealing is available to provide the seal. Furthermore, the fins 48 define four corners of a square or rectangle. The generally square or rectangular shape is resistant to rolling or twisting when the ring seal 27 is being installed in the ring seal groove 46, unlike a circular cross-section o-ring. Such a roll or twist can cause a reduced cross-section at the location of the twist and bulging at other locations. A reduced cross-section reduces the sealing forces against the sealing surfaces and reduces the seal integrity, and bulging can position the seal to be pinched and potentially damaged. The generally square or rectangular shape is also easier to retain in the seal groove 46 than other shapes, for example, a circular cross-section seal. Because the X-shaped ring seal 27 is easier to retain in the seal groove 46, the likelihood that the ring seal 27 will be displaced from the index cover 26 prior to mating with the meter body 12, such as during shipping or installation, is reduced. The elastomer of the ring seal 27 can be selected to be a durable elastomer and to discourage boding to the index cover 26 or meter body 12, such as buna-N, viton, nitrile, butyl, polyurethane, or other elastomer, so that the ring seal 27 can be re-used over multiple matings of the index cover 26 to the meter body 12.

An optional guard ring 44 can be affixed to or incorporated into the index cover flange 36, but may also or alternatively be affixed to or incorporated into the meter body 12. The guard ring 44 circumscribes the perimeter of the ring seal 27, and extends outward to overlap or span an interface between the index cover 26 and the meter body 12.

In an installation, the flow meter assembly 10 may be inadvertently or intentionally sprayed by water, for example in cleaning the flow meter assembly 10 or index cover 26. A direct spray of water, especially at high pressure, may penetrate the seal formed between the ring seal 27 and the meter body 12. By overlapping or spanning the interface between the index cover flange 36 or 42 and the meter body flange 28, the guard ring 44 guards the seal formed by the ring seal 27 against direct spray of water. A similar index guard ring 44 may be provided on other embodiments of the index cover, such as on the index cover flange 42 of the index cover 40 as depicted in FIG. 5.

Many elastomers suitable for ring seal 27 degrade from prolonged exposure to ultraviolet (UV) light. According to one implementation of the invention, the index cover 26 can be constructed from a UV filtering transparent or translucent polymer to impede or substantially block transmission of UV to the ring seal 27, thereby shielding the ring seal 27 from UV damage. One illustrative UV filtering polymer is sold under the trademark Lexan, type number OQ4320-1132 by the General Electrical Corporation and to which the Lexan trademark is registered.

A number of embodiments of the invention have been described. Nevertheless, it will be understood that various modifications may be made without departing from the spirit and scope of the invention. Accordingly, other embodiments are within the scope of the following claims.

What is claimed is:

1. A device for use in measuring gas flow, comprising:
   a meter body housing a gas flow measuring device adapted to output a signal indicative of a gas flow from an inlet of the meter body to an outlet of the meter body, the meter body having a substantially planar surface on an exterior surface;
   an index coupled to the meter body about the substantially planar surface and the gas flow measuring device, the index adapted to display a representation of an amount of gas flow;
   an index cover adapted to house the index and defining an open end through which the index is received, the index cover open end having a substantially planar surface adapted to contact the substantially planar surface of the meter body;
   an elastomeric ring seal received between the index cover and the meter body, the ring seal having a substantially X-shaped cross-section that defines a plurality of discrete lines substantially parallel to the perimeter of the ring seal, at least one line adapted to contact a surface of the index cover and at least one line adapted to contact the substantially planar surface of the flow meter body when the index cover is joined to the flow meter; and
   a seal groove disposed in the substantially planar end surface of the index cover, said groove retains the ring seal in a substantially stationary position without the aid of gravity when the index cover is separated from the meter body, the seal groove being defined by a bottom surface and two substantially planar side surfaces and an opening between the two side surfaces, said opening being narrower than the substantially X-shaped cross-section of the ring seal, wherein the seal is retained in said ring groove by compression of the seal by the two side surfaces of the ring groove.

2. The device of claim 1 further comprising a flange member about the open end of the index cover, the flange member adapted to be joined to the meter body with a plurality of fasteners.

3. The device of claim 2 wherein the index cover further defines a shoulder extending outward therefrom; and
wherein the flange member is moveable relative to the index cover and adapted to be received over the index cover and about the shoulder when joined to the flow meter.

4. The device of claim 2 wherein the index cover comprises a material that is translucent or transparent in a region about the ring seal; and
wherein the flange member comprises a material that substantially blocks transmission of ultraviolet light through the flange member.

5. The device of claim 1 wherein the index cover comprises a transparent material and that is further adapted to substantially impede transmission of ultraviolet light through the index cover.

6. The device of claim 1 further comprising a guard ring formed integrally with the index cover and operable to circumscribe an exterior of the ring seal and span a juncture between the index cover and the meter body.

7. The device of claim 2 further comprising a guard ring formed integrally with the flange member and operable to circumscribe an exterior of the ring seal and span a juncture between the index cover and the meter body.

8. The flow meter of claim 1 wherein the seal is formed to the index cover by at least one of co-injection molding and overmolding.

9. The device of claim 1 wherein the ring seal comprises a plurality of outwardly extending fins that run substantially parallel to a perimeter of the ring seal, the fins defining the lines at which the seal is adapted to seal.

10. The device of claim 9 wherein the ring seal comprises four fins.

11. The device of claim 1 further comprising an alignment ring on the meter body adapted to substantially circumscribe an interior of the open end of the index cover and guide the index cover onto the meter body during assembly of the device.

12. The device of claim 1 wherein the ring seal is a substantially continuous ring.

13. A device for measuring flow comprising:
a means for measuring flow and outputting a signal indicative of the flow between an inlet of the device and an outlet of the device;
a housing adapted to house the means for measuring flow;
a means for transforming the output signal to a representation of an amount of flow;
a cover adapted to house at least a portion of the means for transforming;
a means for sealing along a plurality of discrete seal lines between the housing and the cover and circumscribing the cover; and
a seal groove disposed in a substantially planar end surface of the cover, said groove retains the sealing means in a substantially stationary position in the ring groove without the aid of gravity when the cover is separated from the housing, the seal groove being defined by a bottom surface and two substantially planar side surfaces and an opening between the two side surfaces, said opening being narrower than a cross-sectional width of the sealing means.

14. The device of claim 13 further comprising a guard ring operable to circumscribe an exterior of the means for sealing and spans a juncture between the housing and the cover.

15. The device of claim 13 wherein the means for sealing has a substantially X-shaped cross-section that defines the plurality of discrete seal lines between the housing and the cover.

16. The device of claim 13 wherein the means for sealing comprises a plurality of fins extending substantially parallel to a perimeter of the seal groove, the opening of the seal groove being narrower than the cross-section width between two of the fins so that the two fins are partially compressed between two of the surfaces of the seal groove.

17. The device of claim 13 further comprising an alignment ring on the housing adapted to substantially circumscribe an interior of an open end of the cover and guide the cover onto the housing during assembly of the device.

18. The device of claim 13 wherein the means for sealing is a substantially continuous ring.

19. The device of claim 13 wherein the means for sealing is formed to the cover by at least one of co-injection molding and overmolding.

* * * * *